United States Patent Office 3,522,300
Patented July 28, 1970

3,522,300
PREPARATION OF α-HYDROXY-β-ALKOXYPRO-
PIONIC ACIDS OR SALTS THEREOF
Johannes Gielkens and Cornelis H. Vrinssen, Geleen, Anna M. van de Bosch, Heerlen, and Harmannus Bos, Geleen, Netherlands, assignors to Stamicarbon N.V., Heerlen, Netherlands
No Drawing. Filed Jan. 26, 1967, Ser. No. 611,850
Claims priority, application Netherlands, Feb. 1, 1966, 6601300
Int. Cl. C07c 59/04
U.S. Cl. 260—535        1 Claim

ABSTRACT OF THE DISCLOSURE

Preparation of α-hydroxy-β-alkoxypropionic acids or salts by reaction of a salt of glycidic acid with an alcanolate by mixing said components in alcanol and heating the mixture, preferably at 30–150° C.

DETAILED DESCRIPTION OF THE INVENTION

The present invention relates to the preparation of α-hydroxy-β-alkoxypropionic acids, which substances have not been produced so far.

It is known that epoxy compounds that are soluble in alcohols are in general capable of reacting with the alcohols to yield hydroxy ethers. This reaction is promoted by addition of slight amounts of substances giving an alkaline reaction, such as hydroxides and alkanolates of alkali metals.

Experiments have shown that such an additive reaction does not take place if use is made of salts of epoxypropionic acid (salts of glycidic acid, called glycidates), which are virtually insoluble in alkanols. In that case, other products, such as oligomers of the glycidate and salts of glyceric acid, are obtained.

It was found that α-hydroxy-β-alkoxypropionic acids or salts thereof are obtained if a salt of glycidic acid is made to react with an alkanolate by mixing the glycidate and the alkanolate with an alkanol and heating the mixture until a solution of a salt of α-hydroxy-β-alkoxypropionic acid is obtained, the said salt is separated from the alkanol, and the α-hydroxy-β-alkoxypropionic acid is recovered from the salt by treating the latter with an acid.

By preference, the glycidate is reacted with an equivalent amount of the alkanolate. If a smaller amount of alkanolate is used, oligomers of the glycidate will be formed in addition to the desired product. The use of an excess of the alkanolate, e.g., 1.5 to 3 times the equivalent amount, promotes a complete conversion of the glycidate, while the excess alkanolate can be made to react again with a fresh amount of glycidate.

Examples of salts of glycidic acid (epoxypropionic acid) that can be used according to the invention are the glycidates of alkali metals, such as sodium, potassium and lithium, which readily react with the alkanolate. It is also possible to use glycidates of other metals, for instance, calcium and zinc, which react at a slower rate.

Any metal alkanolate may be used as the alkanolate. By preference, use is made of metal compounds of alkanols the molecule of which contains an unbranched chain of more than 6 carbon atoms, such as octanol, decanol, dodecanol, tetradecanol and hexadecanol.

By using alkanolates with an unbranched carbon chain, α-hydroxy-β-alkoxypropionic acids and salts thereof are obtained, which likewise have an unbranched chain. These acids and salts possess surface-active properties, so that they can be used as emulsifiers, washing agents and the like. It is highly important that they can be broken down by bacteria, so that the purification of waste water does not present any appreciable difficulties if use is made of these products.

The alkanolates having an unbranched chain of an even number of carbon atoms, as is found in natural products, are readily accessible. It is also possible to use other alkanolates having a chain of an odd number of carbon atoms and alkanolates having a branched carbon chain. The salts and the esters of the α-hydroxy-β-alkoxypropionic acids obtained, e.g. calcium salts and ethyl esters, can be added to high-molecular products to affect the properties thereof. If use is made of alkanolates of the lower alkanols, e.g., hexanol, isobutanol, isopropanol, ethanol and methanol, the corresponding α-hydroxy-β-alkoxypropionic acids are obtained, the esters of which are of importance in the paint industry.

In carrying out the process according to the invention, the glycidate and the alkanolate are mixed with an alkanol, as a result of which a suspension of the glycidate in an alcoholic alkanolate solution is obtained. The amount of alkanol used with respect to the alkanolate can be varied. An amount of 5–25 moles of alkanol per mole of alkanolate is usually sufficient for obtaining a suspension of the glycidate that can be readily stirred; if so desired, however, smaller or larger amounts may be used.

There is no need for the alkyl group of the alkanol to be the same as that of the alkanolate. However, an easy method of preparing an alkanolate solution consists in dissolving a metal in an excess of alkanol.

The mixture of glycidate, alkanolate and alkanol is then made to react by heating it. By preference, a temperature of 30–150° C. is used to that end. At temperatures below 30° C. the reaction proceeds only very slowly or not at all. At temperatures above 150° C. the number of undesired side reactions increases. To maintain a liquid phase, an elevated pressure may be applied in the case of alkanols boiling below 150° C. By preference, the temperature is not kept above the boiling temperature, so that the reaction can be effected at the boiling temperature and at atmospheric pressure with reflux cooling or at a lower temperature with simultaneous stirring.

In the reaction a solution of a salt of α-hydroxy-β-alkoxypropionic acid is obtained, so that it is completed when no solid glycidate is present any more. If the reaction is stopped prematurely or if an excess of glycidate is used, the non-converted part of the starting product can be separated from the solution in a simple way, e.g., by filtration.

The salt formed can be separated from the resulting solution, e.g., by removing the alkanol by distillation. By preference, use is made of a precipitant. Suitable precipitants are liquids which can be mixed with the alkanol, but do not dissolve the salt to be separated off, such as acetone and ether.

The α-hydroxy-β-alkoxypropionic acid can be recovered from the salt separated off by treating this salt with an acid, e.g., hydroxychloric acid, sulfuric acid, acetic acid, or a sulfonic acid, in a way known in itself.

Example I 41.3 g. (0.375 mole) of sodium glycidate is added to a solution of 8.6 g. (0.375 mole) of sodium metal in 1500 ml. of octanol with simultaneous stirring, the temperature being kept at 55–60° C. Stirring is continued until no solid glycidate is present any more.

Upon cooling to 30–50° C., the resulting solution is poured into 3 l. of acetone, as a result of which the sodium salt of α-hydroxy-β-octoxypropionic acid is obtained in the form of a white precipitate. After being filtered, the salt is introduced into 0.5 l. of water. Acidification with concentrated hydrochloric acid and extraction with ether yield 66.2 g. of α-hydroxy-β-octoxypropionic acid (yield 81%). The chemical composition of the acid obtained is confirmed by analysis. The acid melts at 47° C.

Example II

Following the procedure described in Example I, the α-hydroxy-β-decoxypropionic acid (melting point 65° C.) is prepared from sodium glycidate and decanol. Yield 78%.

Example III

Following the procedure described in Example I, the α-hydroxy-β-dodecoxypropionic acid is prepared from sodium glycidate and dodecanol. Yield 77%.

Example IV

Following the procedure described in Example I, the α-hydroxy-β-dodecoxypropionic acid is prepared from sodium glycidate and tetradecanol. Yield 76%.

Example V

Following the procedure described in Example I, the α-hydroxy-β-dodecoxypropionic acid is prepared from sodium glycidate and hexadecanol. Yield 74%.

What is claimed is:

1. In a process for the preparation of α-hydroxy-β-alkoxypropionic acids or salts thereof, the improvement wherein a salt of glycidic acid is made to react with an alkali metal alkonolate having 1 to 20 carbon atoms in its molecule, by mixing the salt of glycidic acid and at least an equimolecular amount of the alkanolate with an alkanol to obtain a suspension of the glycidate and heating the suspension at a temperature of 30–150° C. until a solution of α-hydroxy-β-alkoxypropionic acid-salt is obtained, and subsequently removing the alkanol from said salt, which yields the free acid by treatment with an acid.

References Cited

UNITED STATES PATENTS

| | | | |
|---|---|---|---|
| 2,053,708 | 9/1936 | Fife | 260—615 |
| 2,183,853 | 12/1939 | Haussmann et al. | 260—535 XR |
| 2,327,053 | 8/1943 | Marple et al. | 260—615 |
| 2,399,285 | 4/1946 | Muskat et al. | 260—535 XR |
| 2,808,442 | 10/1957 | Smith et al. | 260—535 XR |
| 2,915,532 | 12/1959 | Walton | 260—535 XR |
| 3,062,890 | 11/1962 | Payne et al. | 260—602 |

FOREIGN PATENTS

| | | |
|---|---|---|
| 1,006,358 | 9/1965 | Great Britain. |
| 1,035,382 | 7/1966 | Great Britain. |

OTHER REFERENCES

Koelsch: J. Am. Chem. Soc., vol. 52, pp. 2430–2436 (1930).

LORRAINE A. WEINBERGER, Primary Examiner

P. J. KILLOS, Assistant Examiner

U.S. Cl. X.R.

260—484